United States Patent
Kottilingal et al.

(10) Patent No.: US 8,943,330 B2
(45) Date of Patent: Jan. 27, 2015

(54) APPARATUS AND METHOD FOR HARDWARE-BASED SECURE DATA PROCESSING USING BUFFER MEMORY ADDRESS RANGE RULES

(75) Inventors: Sudeep Ravi Kottilingal, San Diego, CA (US); Jayanth Mandayam, San Diego, CA (US); Ron Keidar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 84 days.

(21) Appl. No.: 13/467,853

(22) Filed: May 9, 2012

(65) Prior Publication Data

US 2013/0132735 A1 May 23, 2013

Related U.S. Application Data

(60) Provisional application No. 61/484,575, filed on May 10, 2011.

(51) Int. Cl.
| | |
|---|---|
| *G06F 21/00* | (2013.01) |
| *G06F 17/00* | (2006.01) |
| *G06F 12/14* | (2006.01) |
| *G06F 21/62* | (2013.01) |
| *G06F 21/79* | (2013.01) |

(52) U.S. Cl.
CPC ........ *G06F 12/1408* (2013.01); *G06F 21/6218* (2013.01); *G06F 21/79* (2013.01); *G06F 2221/2113* (2013.01)
USPC .............................................. 713/189; 726/1

(58) Field of Classification Search
CPC .................... G06F 2221/2113; G06F 12/1408; G06F 21/6218; G06F 21/79
USPC ......... 713/187, 189, 190, 164, 165, 168, 191, 713/193, 194; 726/1, 3, 28; 705/14, 51
See application file for complete search history.

(56) References Cited

U.S. PATENT DOCUMENTS

| | | | |
|---|---|---|---|
| 4,184,201 A | 1/1980 | Melberg et al. | |
| 6,101,170 A * | 8/2000 | Doherty et al. | 370/255 |
| 6,397,301 B1 | 5/2002 | Quach et al. | |
| 6,615,404 B1 * | 9/2003 | Garfunkel et al. | 717/173 |
| 6,640,304 B2 * | 10/2003 | Ginter et al. | 713/193 |
| 6,650,639 B2 * | 11/2003 | Doherty et al. | 370/389 |
| 6,782,480 B2 * | 8/2004 | Mirov | 713/300 |

(Continued)

OTHER PUBLICATIONS

International Search Report and Written Opinion—PCT/US2012/037389—ISA/EPO—Aug. 16, 2012.

(Continued)

*Primary Examiner* — Abu Sholeman
(74) *Attorney, Agent, or Firm* — Liberty Mann; Thomas A. Jolly

(57) ABSTRACT

A processor is utilized for processing data from a buffer memory. The processor, implemented in hardware, may allow writing of output data, processed based on input data from at least one secure location associate with a secure address range of the buffer memory, to one or more secure locations associated with the secure address range. Further, the processor may block writing of output data, processed based on input data from at least one secure location associated with the secure address range, to one or more insecure locations associated with an insecure address range of the buffer memory.

30 Claims, 5 Drawing Sheets

(56) References Cited

U.S. PATENT DOCUMENTS

| | | | |
|---|---|---|---|
| 6,992,563 B1* | 1/2006 | Plumeier | 340/5.54 |
| 7,363,491 B2 | 4/2008 | Oconnor | |
| 7,398,366 B2* | 7/2008 | Ohran et al. | 711/162 |
| 7,430,690 B2* | 9/2008 | Meyer-Grafe et al. | 714/43 |
| 7,509,502 B2 | 3/2009 | Francis et al. | |
| 7,660,769 B2 | 2/2010 | Shimizu | |
| 7,788,505 B2 | 8/2010 | Porter et al. | |
| 2003/0048779 A1* | 3/2003 | Doherty et al. | 370/389 |
| 2006/0218411 A1* | 9/2006 | Lutnaes | 713/193 |
| 2007/0055912 A1* | 3/2007 | Meyer-Grafe et al. | 714/43 |
| 2008/0052541 A1* | 2/2008 | Ginter et al. | 713/194 |
| 2008/0065907 A1 | 3/2008 | Nutter et al. | |
| 2008/0079817 A1* | 4/2008 | Murata et al. | 348/222.1 |
| 2008/0086603 A1* | 4/2008 | Lahtinen et al. | 711/147 |
| 2008/0104711 A1 | 5/2008 | Johns et al. | |
| 2008/0232769 A1* | 9/2008 | Jureczki et al. | 386/94 |
| 2008/0244612 A1 | 10/2008 | Murase et al. | |
| 2008/0284561 A1* | 11/2008 | Chang et al. | 340/5.6 |
| 2009/0138729 A1* | 5/2009 | Hashimoto et al. | 713/193 |
| 2009/0254986 A1 | 10/2009 | Harris et al. | |
| 2010/0077231 A1 | 3/2010 | Nason et al. | |
| 2010/0100747 A1* | 4/2010 | Boscher et al. | 713/187 |
| 2010/0153672 A1* | 6/2010 | Jogand-Coulomb et al. | 711/164 |
| 2010/0199096 A1* | 8/2010 | Du | 713/176 |
| 2010/0306444 A1* | 12/2010 | Shirley et al. | 711/6 |
| 2011/0022482 A1* | 1/2011 | Florek et al. | 705/16 |
| 2012/0185953 A1* | 7/2012 | Van Riel et al. | 726/32 |
| 2013/0018927 A1* | 1/2013 | Chang | 707/805 |
| 2013/0191649 A1* | 7/2013 | Muff et al. | 713/190 |
| 2013/0246812 A1* | 9/2013 | Resch et al. | 713/193 |
| 2013/0305388 A1* | 11/2013 | Kottilingal et al. | 726/28 |
| 2013/0340068 A1* | 12/2013 | Lee et al. | 726/16 |

OTHER PUBLICATIONS

Sandhu et al., "Lattice-Based Access Control Models", Computer, IEEE Service Center, Los Alamitos, CA, US, vol. 26, No. 11, Nov. 1, 1993, pp. 9-19, XP002353292, ISSN: 0018-9162, DOI: 10.1109/2.241422 the whole document.

Shimizu, K. et al., "Cell Broadband Engine Processor Vault Security Architecture", IBM Journal of Research and Development, vol. 51 (Issue 5): pp. 521-528, Sep. 2007.

* cited by examiner

APPARATUS AND METHOD FOR HARDWARE-BASED SECURE DATA PROCESSING USING BUFFER MEMORY ADDRESS RANGE RULES

CROSS-REFERENCE TO RELATED APPLICATION

This application claims the benefit of U.S. Provisional Application No. 61/484,575, filed May 10, 2011, which is hereby incorporated herein by reference in its entirety.

BACKGROUND

1. Field

The present invention relates generally to secure data processing in an apparatus such as a computer or remote station.

2. Background

An apparatus may use an operating system that may have an open-source kernel and/or highly-accessible low-level software. Unfortunately, security implementations in the kernel can be changed for the purpose of extracting protected content, such as multimedia content protected using DRM (Digital Rights Management).

There is therefore a need for an effective technique for secure data processing.

SUMMARY

An aspect of the present invention may reside in a processor, implemented in hardware, for processing data from a buffer memory. The processor includes a protection unit. The protection unit is configured to allow writing of output data, processed based on input data from at least one secure location associated with a secure address range of the buffer memory, to one or more secure locations associated with the secure address range. The protection unit is further configured to block writing of output data, processed based on input data from at least one secure location associated with the secure address range, to one or more insecure locations associated with an insecure address range of the buffer memory In more detailed aspects of the invention, protection unit may be further configured to allow writing of output data, processed based on input data from at least one insecure location associated with the insecure address range, to one or more insecure locations associated with the insecure address range. The addresses for the secure address range may comprise virtual addresses. The secure address range may comprise a page of the buffer memory. The virtual addresses may be mapped to physical addresses in the buffer memory by a page table. Alternatively, the addresses for the secure address range may comprise physical addresses.

In other more detailed aspects of the invention, the input data may be based on data extracted from protected content from a protected source. The output data may be for reading from the buffer memory by a display hardware for display.

Another aspect of the invention may reside in an apparatus for processing data from a buffer memory, comprising: means for allowing writing of output data, processed based on input data from at least one secure location associated with a secure address range of the buffer memory, to one or more secure locations associated with the secure address range; and means for blocking writing of output data, processed based on input data from at least one secure location associated with the secure address range, to one or more insecure locations associated with an insecure address range of the buffer memory.

Another aspect of the invention may reside in a computer program product, comprising a computer-readable medium, comprising code for causing a computer to allow writing of output data, processed based on input data from at least one secure location associated with a secure address range of a buffer memory, to one or more secure locations associated with the secure address range; and code for causing a computer to block writing of output data, processed based on input data from at least one secure location associated with the secure address range, to one or more insecure locations associated with an insecure address range of the buffer memory.

Another aspect of the invention may reside in a method for processing data from a buffer memory. The method may include allowing a processor implemented in hardware to write output data, processed based on input data from at least one secure location associated with a secure address range of the buffer memory, to one or more secure locations associated with the secure address range. The method further may include blocking the processor from writing output data, processed based on input data from at least one secure location associated with the secure address range, to one or more insecure locations associated with an insecure address range of the buffer memory.

Another aspect of the invention may reside in an apparatus including a buffer memory and a processor. The buffer memory has a plurality of addressable locations comprising secure locations associated with a secure address range, and insecure locations associated with an insecure address range. The processor is implemented in hardware for processing data from the secure locations and from the insecure locations. The processor is configured to allow writing of output data, processed based on input data from at least one of the secure locations associated with the secure address range, to one or more of the secure locations associated with the secure address range. The processor is also configured to block writing of output data, processed based on input data from at least one of the secure locations associated with the secure address range, to one or more of the insecure locations associated with the insecure address range.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 1:
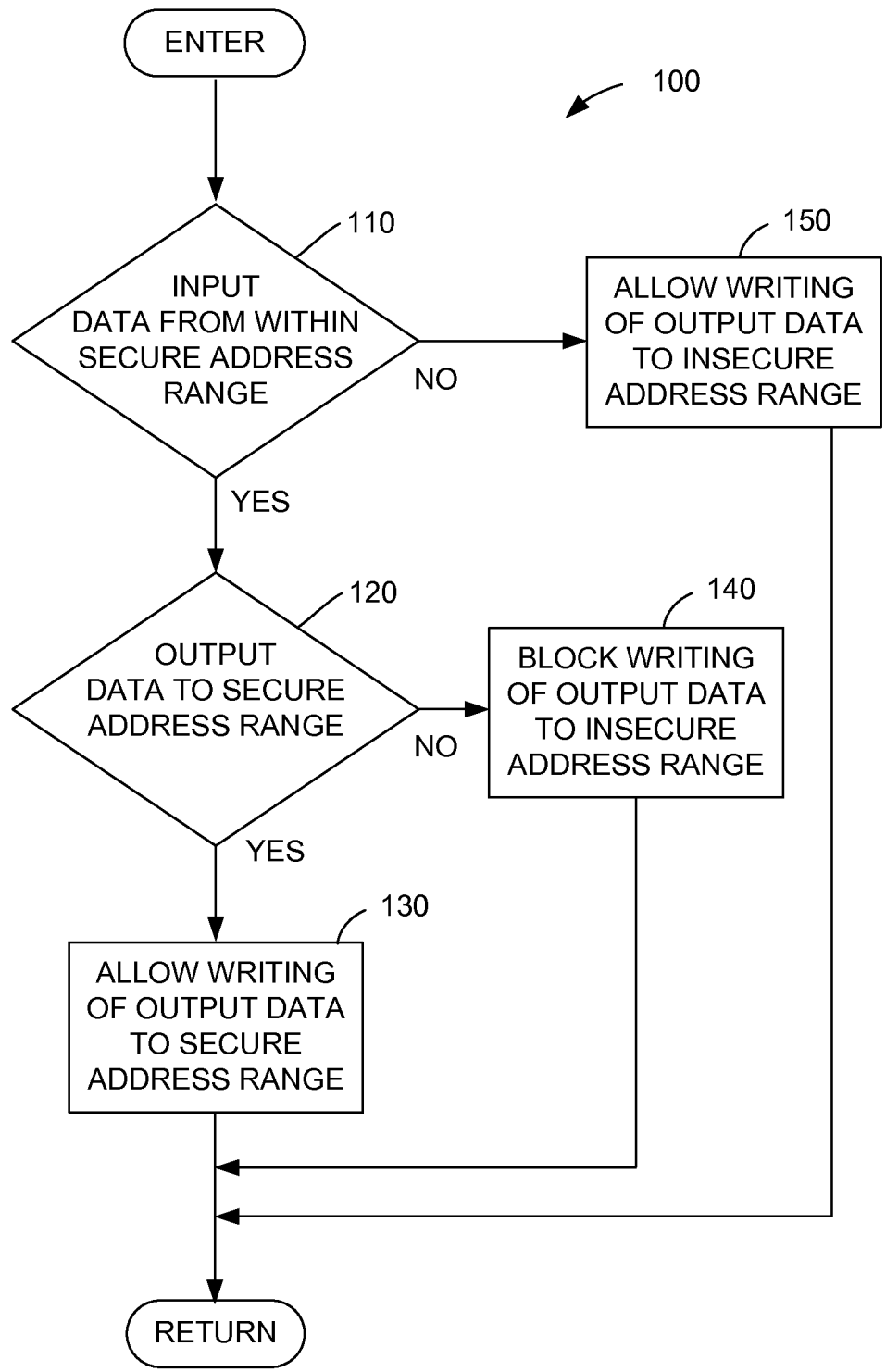
FIG. 1 is a flow diagram of a method for processing data from a buffer memory having a plurality of addressable locations comprising locations associated with a secure address range and locations associated with an insecure address range, according to the present invention.
Figure 2:
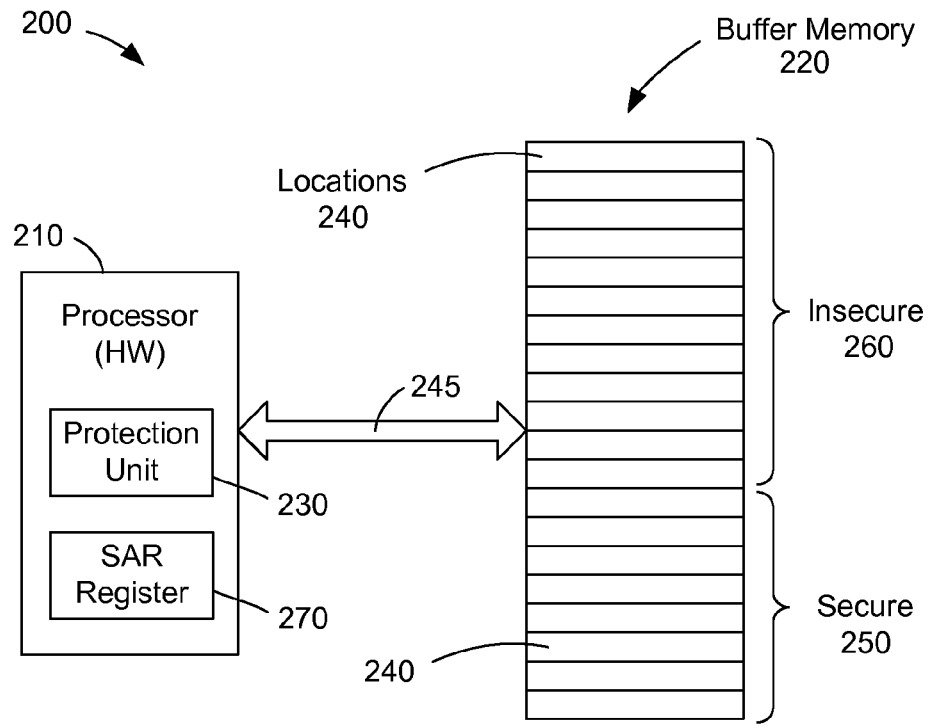
FIG. 2 is a block diagram of an apparatus including a buffer memory and a processor having a protection unit, according to the present invention.

With reference to FIGS. 1 and 2, an aspect of the present invention may reside in a processor 210, implemented in hardware, for processing data from a buffer memory 220. The processor 210 includes a protection unit 230. The processor 210 reads pre-processed data from memory locations 240 in the buffer memory 220 over a data bus 245. After further processing, the processor 210 writes processed data back to memory locations in the buffer memory 220. The data stored in the buffer memory 220 may have been extracted from protected content, such as multimedia content protected using DRM, or the like. It is advantageous to keep such data secure as it is processed and "flows" through the buffer memory 220. Accordingly, the data extracted from protected content is stored in location(s) 240 associated with a secure address range 250 of the buffer memory 220. The protection unit 230 provides hardware protection of data flows though the buffer memory 220, in some embodiments, without having to keep track of the data flows and associated sessions, and privileges for the sessions.

According to the security rules shown in FIG. 1, the protection unit 230 is configured to allow writing of output data to one or more secure locations 240 associated with the secure address range 250 when the output data was processed based on input data from at least one secure location 240 associated with a secure address range 250 of the buffer memory 220. The protection unit 230 is further configured to block writing of output data to one or more insecure locations 240 associated with an insecure address range 260 of the buffer memory 220 when the output data was processed based on input data from at least one secure location 240 associated with the secure address range 250.

In more detailed aspects of the invention, protection unit 230 may be further configured to allow writing of output data, processed based on input data from at least one insecure location associated with the insecure address range 260, to one or more insecure locations associated with the insecure address range 260. Thus, unprotected content may be processed without affecting the security of the securely stored protected content.

The addresses for the secure address range 250 may comprise virtual addresses. Alternatively, the addresses for the secure address range may comprise physical addresses. In a protected memory scheme, physical addresses of memory locations 240 in the buffer memory 220 may be mapped to virtual addresses by, for example, a page table, to allow sharing of the physical memory by different processes and/or sessions using respective independent virtual address spaces. Generally, physical addresses are mapped as 4 kilobyte pages, although other page sizes may be used. Thus, the secure address range 250 of the protected buffer memory 730 (illustrated in FIG. 7) may comprise a page of memory locations. In one embodiment, the processor 210 implements the security rules of FIG. 1 by requiring writing of the output data to the same page as the input data. In such embodiment, the processor 210 blocks writing of the output data to another page. If the secure address range 250 comprises multiple pages, the pages may or may not be contiguous in the buffer memory 220.

The memory locations 240 may be grouped in other configurations including blocks, segments, portions, and the like. The secure address range 250 of buffer memory 220 may encompass such blocks, segments, portions, etc.

A data store such as a secure address range (SAR) register 270 may store the secure address range 250. The register 270 may be in a securely protected zone to prevent alteration or hacking by malicious software. When the input data is read, the secure address range register 270 may be checked by the protection unit 230 to determine whether the input data is from a secure location. Similarly, when output data is to be written, the secure address range register 270 may be checked by the protection unit 230 to determine whether the output data is to be written to a secure location.

Another aspect of the invention may reside in an apparatus 200 for processing data from a buffer memory 220, comprising: means (230) for allowing writing of output data, processed based on input data from at least one secure location 240 associated with a secure address range 250 of the buffer memory 220, to one or more secure locations 240 associated with the secure address range 250; and means (230) for blocking writing of output data, processed based on input data from at least one secure location associated with the secure address range 250, to one or more insecure locations associated with an insecure address range 260 of the buffer memory 220.

Figure 3:
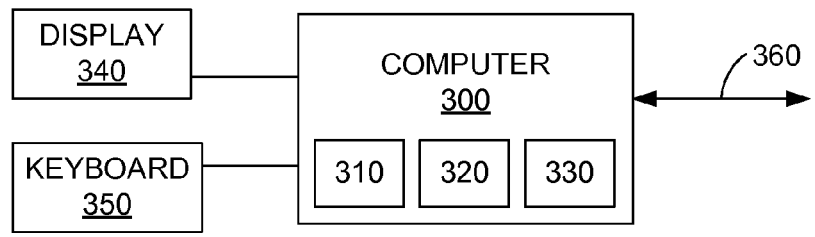
FIG. 3 is a block diagram of a computer including a processor and a memory.

Another aspect of the invention may reside in a computer program product, comprising a computer-readable medium 320 (FIG. 3), comprising code for causing a computer 300 to allow writing of output data, processed based on input data from at least one secure location 240 associated with a secure address range 250 of a buffer memory 220, to one or more secure locations associated with the secure address range 250; and code for causing a computer to block writing of output data, processed based on input data from at least one secure location associated with the secure address range 250, to one or more insecure locations associated with an insecure address range 260 of the buffer memory 220.

Another aspect of the invention may reside in a method 100 for processing data from a buffer memory 220. The method 100 may include allowing a processor 210 implemented in hardware to write output data, processed based on input data from at least one secure location 240 associated with a secure address range 250 of the buffer memory 220 (step 110), to one or more secure locations associated with the secure address range 250 (steps 120 and 130). The method 100 further may include blocking the processor 210 from writing output data, processed based on input data from at least one secure location associated with the secure address range 250, to one or more insecure locations associated with an insecure address range 260 of the buffer memory 220 (step 140). The method 100 may further include allowing the processor 210 to write output data, processed based on input data from at least one insecure location associated with the insecure address range 260, to one or more insecure locations associated with the insecure address range 260 (step 150).

Another aspect of the invention may reside in an apparatus 200 including a buffer memory 220 and a processor 210. The buffer memory 220 has a plurality of addressable locations 240 comprising secure locations associated with a secure address range 250, and insecure locations associated with an insecure address range 260. The processor 210 is implemented in hardware for processing data from the secure locations and from the insecure locations. The processor 210 is configured to allow writing of output data, processed based on input data from at least one of the secure locations associated with the secure address range 250, to one or more of the secure locations associated with the secure address range 250. The processor 210 is also configured to block writing of output data, processed based on input data from at least one of the secure location associated with the secure address range 250, to one or more of the insecure locations associated with the insecure address range 260.

The apparatus 200 may be a remote station comprising a computer 300 that includes a processor 310, such as processor 210, a storage medium 320, such as memory 220 and disk drives, a display 340, an input device, such as a keyboard 350, a microphone, speaker(s), a camera, and the like. The station may include an interface, for example, an antenna and/or modem and/or transceiver, for use with a wireless connection 360. In some embodiments, the station may further comprise a secure module 330. The secure module 330 may be used in some embodiments to implement the protection unit 230 and/or the SAR register 270 separate from the processor 310. In other embodiments, the secure module 330 may implement other security and/or write-protection functions. In some embodiments, the secure module 330 may be omitted. In one example embodiment where the protection unit 230 and the SAR register 270 are implemented in the processor 310, the secure module 330 is omitted. Further, the station may also include USB, Ethernet and/or similar interfaces.

Figure 5:
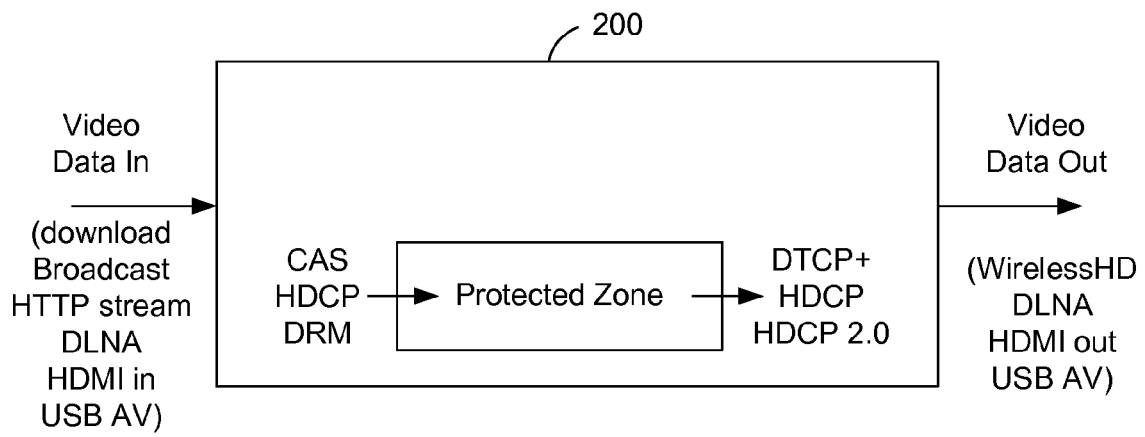
FIG. 5 is a block diagram of a flow of data though an apparatus having a protected zone.

With reference to FIG. 5, content such as video data may be input to the apparatus 200 from a variety of sources such as download, broadcast, http stream, DLNA (Digital Living Network Alliance), HDMI (High-Definition Multimedia Interface), USB AV (Universal Serial Bus Audio/Visual), and the like. Protected content (CAS (Conditional Access System), HDCP (High-bandwidth Digital Content Protection), DRM (Digital Rights Management), etc). is directed to a protected zone implemented by the apparatus. The higher level operating system (or kernel) is not able to directly access the protected zone. The apparatus provides processed output data (words) to addressable memory locations 240 associated with or within a secure address range 250 in accordance with security rules (FIG. 1). The output data may be protected content (DTCP+ (Digital Transmission. Content Protection Plus), HDCP, HDCP 2.0, etc) forwarded directly to a display 340. The output video data may be in accordance with Wireless HD (High-Definition), DLNA, HDMI out, USB AV, and the like.

The protected zone may be associated with an array of processing units for achieving one or more functions. The array of processing units may include a video decoder, mobile data processor, and the like.

Figure 6:
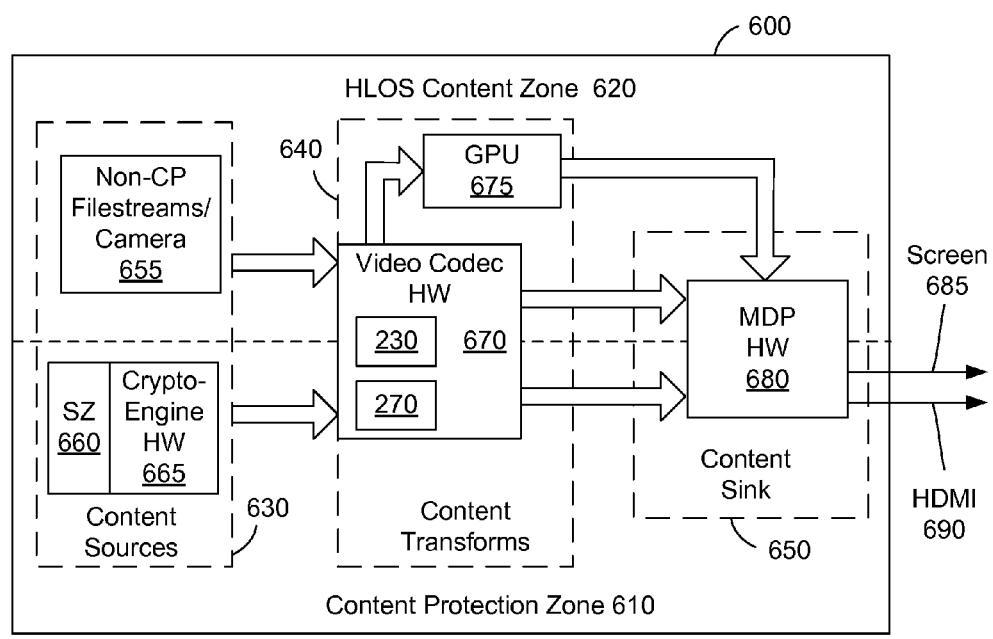
FIG. 6 is a block diagram of flow(s) of data though an apparatus having a protected zone.

With reference to FIG. 6, an apparatus 600—which may, for example, comprise an implementation of the apparatus 200, and/or the computer 300—may have a content protection zone 610 and a higher level operation system (HLOS) content zone 620. In some embodiments, the protection zone 610 may comprise an implementation of the protected zone discussed above. The apparatus may have content sources 630, content transforms 640, and content sink(s) 650. The content sources may be non-content-protected filestreams 655, and protected content associated with a secure zone 660 (secure execution environment) and crypto-engine hardware 665. The protected content may be, for example, multimedia content protected using DRM. Data from protected content sources stays within the content protection zone 610, and data from the non-protected content sources stays within the HLOS content zone 620. The content transforms may be accomplished by video codec hardware 670 and graphics processing unit (GPU) 675. The GPU may operate only on non-protected content, whereas the video codec hardware may operate on protected content and on non-protected content. The video codec hardware may include a protection unit 230 and a SAR register 270 for ensuring that decrypted and/or decoded data is only written to addressable memory locations 240 in accordance with the security rules shown in FIG. 1. The content sink 650 may include mobile display platform (MDP) hardware 680 for outputting the multimedia content to a device screen 685 or 340, or to an HDMI link 690, etc.

Figure 7:
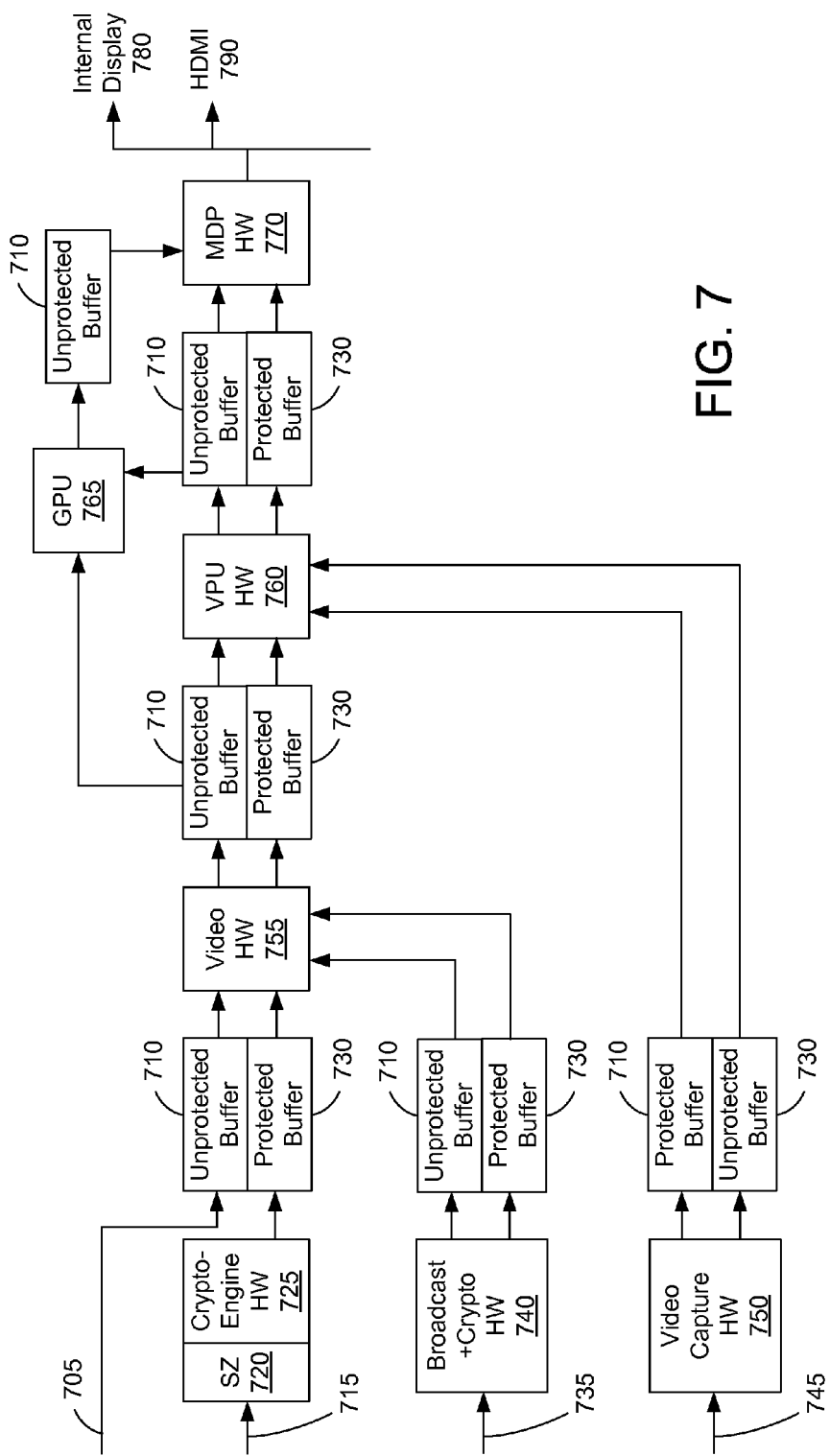
FIG. 7 is a block diagram of flows of data though hardware having protected buffers.

With reference to FIG. 7, a data flow through the buffer memory 220 from a plurality of content sources 630 to a plurality of content sinks 650 is shown in relation to a plurality of content transforms 640. An unprotected buffer 710 corresponds to the memory locations 240 associated with the insecure address range 260 of the buffer memory, and a protected buffer 730 corresponds to the memory locations 240 associated with the secure address range 250 of the buffer memory. To show the flow of data through the buffer memory, the unprotected and protected buffers, 710 and 730, are shown in several instances between the hardware elements. However, the several protected and unprotected buffers may be a unitary addressable memory space of the buffer memory 220 which is connected to the hardware elements by, for example, the bus 245. As examples of content sources, free content from an unprotected source 705 may be placed in memory locations of the unprotected buffer 710 associated with the insecure address range 260, whereas premium content from a protected source 715 may be input into a secure zone 720 (secure execution environment) and crypto-engine hardware 725, and then output to memory locations of the protected buffer 730 associated with the secure address range 250. Broadcast content 735 may be received, decrypted if necessary, and placed in the unprotected buffer 710 or in the protected buffer 730, by broadcast+crypto hardware 740, depending on whether the incoming broadcast signal is encrypted. Similarly, video signals 745 captured by video capture hardware 750 may be placed in the unprotected buffer 710 or in the protected buffer 730, depending on whether the incoming video signal is protected. For example, if HDCP is enabled on an HDMI input, then the content may be treated as protected. Also, if Macrovision®/CGMS-A (Copy Generation Management System-Analog) is detected on an analog input, the content may be treated as protected. For a digital (TTL) input, the content may be treated as protected as a default. As an example of a content transform, video hardware 755 may operate on data from an unprotected buffer 710 and/or a protected buffer 730, and place output data in an unprotected buffer 710 or in a protected buffer 730, in accordance with the security rules of FIG. 1. Similarly, video processor unit (VPU) hardware 760 may operate on data from an unprotected buffer 710 and/or a protected buffer 730, and place output data in an unprotected buffer 710 or in a protected buffer 730, in accordance with the security rules of FIG. 1. A graphics processing unit (GPU) 765 may operate only on data from an unprotected buffer 710, and may place output data only in an unprotected buffer 710. As, examples of content sinks, MDP hardware 770 may read and operate on data from an unprotected buffer 710 and/or a protected buffer 730, and output the data in the from of multimedia content to a device screen 780 or to an HDMI link 790, etc.

A plurality of sessions and/or content streams may exist at the same time. Each session or stream may be associated with a common secure address range 250 or its own secure address range 250 or page of memory locations. For example, a first secure address range or page for a first session or stream may not be considered a secure address range for a second session or stream. The processor hardware may block writing output data associated with a second session or stream to the first secure address range or page, because the first secure address range or page may be considered as an insecure memory location with respect to the second session. If a common secure address range 250 is implemented, however, data protection may be simplified in some embodiments because different address ranges may not be individually tracked with respect to different sessions or streams, but rather a single address range may apply to all or certain protected content. In some embodiments, sessions or streams may be associated with different processors. Each of these processors may be associated with its own secure address range and/or memory buffer in some embodiments. In other embodiments, two or more of the processors may share a memory buffer or a secure address range of that memory buffer.

Embodiments described above may provide hardware protection of data flows though the buffer memory 220 without having to keep track of the data flows and associated sessions, and privileges for the sessions. Thus, protected content and unprotected content from different sources may be processed by content transform hardware without requiring tracking of the privileges of the associated sessions when writing the processed or transformed data to the buffer memory. When the security rules of FIG. 1 are implemented in hardware, malicious software is unable to redirect protected content to an unprotected memory location because the hardware blocks such malicious redirection.

Figure 4:
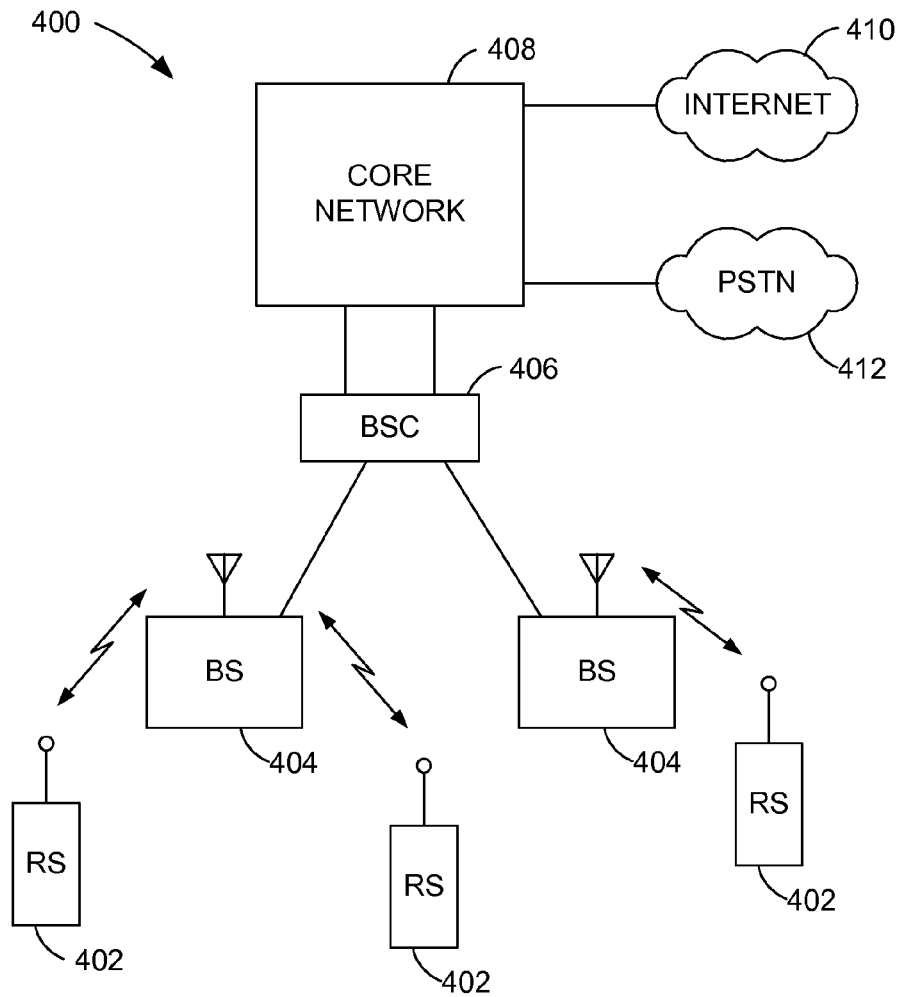
FIG. 4 is a block diagram of an example of a wireless communication system.

With reference to FIG. 4, a wireless remote station (RS) 402 (such as apparatus 200) may communicate with one or more base stations (BS) 404 of a wireless communication system 400. The wireless communication system 400 may further include one or more base station controllers (BSC) 406, and a core network 408. Core network may be connected to an Internet 410 and/or a Public Switched Telephone Network (PSTN) 412 via suitable backhauls. A typical wireless remote station may include a mobile station such as a handheld phone, or a laptop computer. The wireless communication system 400 may employ any one of a number of multiple access techniques such as code division multiple access (CDMA), time division multiple access (TDMA), frequency division multiple access (FDMA), space division multiple access (SDMA), polarization division multiple access (PDMA), or other modulation techniques known in the art.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal.

In one or more exemplary embodiments, the functions described may be implemented in hardware, software, firmware, or any combination thereof If implemented in software as a computer program product, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The computer-readable medium may be non-transitory such that it does not include a transitory, propagating signal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:
1. A device comprising:
   a buffer memory; and a hardware processer coupled to the buffer memory and configured to, in response to a determination that output data to be written is processed based on input data from at least one secure location of the buffer memory associated with a secure address range of the buffer memory:
   allow writing of the output data, processed based on the input data from the at least one secure location, to one or more secure locations of the buffer memory associated with the secure address range, and
   block writing of the output data, processed based on the input data from the at least one secure location, to one or more insecure locations of the buffer memory associated with an insecure address range of the buffer memory;
wherein the hardware processer is further configured to:
   allow writing of other output data, processed based on input data from at least one insecure location of the buffer memory, to the one or more insecure locations of the buffer memory associated with the insecure address range; and
   determine whether the output data to be written is processed based on the input data from the at least one secure location of the buffered memory associated with the secure address range.

2. The device of claim 1, wherein addresses for the secure address range comprise virtual addresses.

3. The device of claim 2, wherein the secure address range comprises a page of the buffer memory.

4. The device of claim 3, wherein the virtual addresses are mapped to physical addresses in the buffer memory by a page table.

5. The device of claim 1, wherein addresses for the secure address range comprise physical addresses.

6. The device of claim 1, wherein the input data from the at least one secure location is based on data extracted from protected content from a protected source.

7. The device of claim 1, wherein the output data, processed based on the input data from the at least one secure location, is for reading from the buffer memory by a display hardware.

8. An apparatus for processing data from a buffer memory, comprising:
   means for allowing writing of the output data, processed based on input data from at least one secure location of the buffer memory associated with a secure address range of the buffer memory, to one or more secure locations of the buffer memory associated with the secure address range, in response to a determination that the output data to be written is processed based on the input data from the at least one secure location of the buffer memory;
   means for blocking writing of the output data, processed based on the input data from the at least one secure location, to one or more insecure locations of the buffer memory associated with an insecure address range of the buffer memory, in response to a determination that the output data to be written is processed based on input data from the at least one secure location of the buffer memory;
   means for allowing writing of other output data, processed based on input data from at least one insecure location of the buffer memory, to the one or more insecure locations of the buffer memory associated with the insecure address range; and
   means for determining whether the output data to be written is processed based on input data from the at least one secure location of the buffer memory associated with the secure address range.

9. The apparatus of claim 8, wherein addresses for the secure address range comprise virtual addresses.

10. The apparatus of claim 9, wherein the secure address range comprises a page of the buffer memory.

11. The apparatus of claim 10, wherein the virtual addresses are mapped to physical addresses in the buffer memory by a page table.

12. The apparatus of claim 8, wherein addresses for the secure address range comprise physical addresses.

13. The apparatus of claim 8, wherein input data from the at least one secure location is based on data extracted from protected content from a protected source.

14. The apparatus of claim 8, wherein the output data, processed based on the input data from the at least one secure location, is for reading from the buffer memory by a display hardware.

15. An article, comprising:
   a non-transitory computer-readable medium having instructions stored therein which are executable by a hardware processor of a device to:
   in response to a determination that output data to be written is processed based on input data from at least one secure location of a buffer memory coupled to the hardware-based processor associated with a secure address range of the buffer memory:
      allow writing of the output data, processed based on the input data from the at least one secure location, to one or more secure locations of the buffer memory associated with the secure address range; and
      block writing of the output data, processed based on the input data from the at least one secure location, to one or more insecure locations of the buffer memory associated with an insecure address range of the buffer memory: and
   wherein the instructions are further executable by the hardware processor of the device to:
      allow writing of other output data, processed based on input data from at least one insecure location of the buffer memory, to the one or more insecure locations of the buffer memory associated with the insecure address range; and
      determine whether the output data to be written is processed based on the input data from the at least one secure location of the buffered memory associated with the secure address range.

16. The computer program product of claim 15, wherein addresses for the secure address range comprise virtual addresses.

17. The computer program product of claim 16, wherein the secure address range comprises a page of the buffer memory.

18. The computer program product of claim 17, wherein the virtual addresses are mapped to physical addresses in the buffer memory by a page table.

19. The computer program product of claim 15, wherein addresses for the secure address range comprise physical addresses.

20. The computer program product of claim 15, wherein the input data from the at least one secure location is based on data extracted from protected content from a protected source.

21. The computer program product of claim 15, wherein the output data, processed based on the input data from the at least one secure location, is for reading from the buffer memory for display via a display hardware.

22. A method for processing data from a buffer memory, the method comprising, with a hardware processor coupled to the buffer memory:
  determining whether output data to be written is processed based on input data from at least one secure location of a secure address range of the buffer memory;
  in response to a determination that the output data to be written is processed based on the input data from the at least one secure location:
  writing of the output data to one or more secure locations of the secure address range, and
  blocking writing the output data to one or more insecure locations of the buffer memory of an insecure address range of the buffer memory; and
  wherein further comprising, with the hardware processor:
    allowing writing of other output data, processed based on input data from at least one insecure location of the buffer memory, to the one or more insecure locations of the buffer memory of the insecure address range; and
    determining whether the output data to be written is processed based on the input data from the at least one secure location of the buffered memory associated with the secure address range.

23. The method of claim 22, wherein the addresses for secure address range comprise virtual addresses.

24. The method of claim 23, wherein the secure address range comprises a page of the buffer memory.

25. The method of claim 24, wherein the virtual addresses are mapped to physical addresses in the buffer memory by a page table.

26. The method of claim 22, wherein addresses for secure address range comprise physical addresses.

27. The method of claim 22, wherein the input data from the at least one secure location is based on data extracted from protected content from a protected source.

28. The method of claim 22, wherein the output data, processed based on the input data from the at least one secure location, is for reading from the buffer memory for display.

29. An apparatus, comprising:
  a buffer memory having a plurality of addressable locations comprising:
    secure locations associated with a secure address range, and
    insecure locations associated with an insecure address range; and
  a hardware processor coupled to the buffer memory and configured to:
    in response to a determination that output data to be written is processed based on input data from at least one secure location associated with the secure address range of the buffer memory:
      allow writing of the output data, processed based on the input data from the at least one of the secure locations, to one or more of the secure locations of the buffer memory associated with the secure address range, and
      block writing of the output data, processed based on the input data from the at least one of the secure locations, to one or more insecure locations of the buffer memory associated with an insecure address range;
    allow writing of other output data, processed based on input data from at least one insecure location of the buffer memory, to the one or more insecure locations of the buffer memory associated with the insecure address range; and
    determine whether the output data to be written is processed based on the input data from the at least one secure location of the buffer memory associated with the secure address range.

30. The apparatus of claim 29, wherein the output data, processed based on the input data from the at least one secure location, is for reading from the buffer memory by a display hardware.

* * * * *